United States Patent [19]
Malinowski et al.

[11] Patent Number: 5,570,178
[45] Date of Patent: Oct. 29, 1996

[54] SCANNING IMAGING SYSTEM HAVING REDUCED DETECTED SIGNAL ALIASING IN CROSS SCAN DIRECTION

[75] Inventors: Frank R. Malinowski, Santa Barbara; James B. Young, Goleta, both of Calif.

[73] Assignee: Santa Barbara Research Center, Goleta, Calif.

[21] Appl. No.: 353,469

[22] Filed: Dec. 9, 1994

[51] Int. Cl.$^6$ .................................. G01J 1/42
[52] U.S. Cl. ........................... 356/218; 356/221
[58] Field of Search ................... 356/213, 218, 356/221, 226; 359/364–366, 495–498, 708, 726–728; 348/117, 123; 250/334, 338.5; 342/351

[56] References Cited

U.S. PATENT DOCUMENTS

| | | | |
|---|---|---|---|
| 4,575,193 | 3/1986 | Greivenkamp, Jr. | 359/498 |
| 4,624,538 | 11/1986 | MacFarlane | 359/366 |
| 4,628,468 | 12/1986 | Thompson et al. | 356/445 |
| 5,322,998 | 6/1994 | Jackson | 359/709 |

*Primary Examiner*—Hoa Q. Pham
*Attorney, Agent, or Firm*—W. C. Schubert; W. K. Denson-Low

[57] ABSTRACT

A system for receiving electromagnetic energy with reduced signal aliasing in the cross-scan direction. The system is adapted to be mounted on a spacecraft or an aircraft for movement over a surface in the cross-scan direction and has a sensor for receiving electromagnetic energy. The invention (10) includes an arrangement for directing energy to the sensor which has an astigmatic blur in the cross-scan direction which is effective to reduce aliasing of a signal transmitted or received by the system in the cross-scan direction of movement. In the illustrative embodiment, the invention (10) includes an array (20) of radiometric detectors. A reflective optical arrangement directs energy from a surface to the detector array. The optical arrangement includes at least one mirror (16) which has a small controlled cylindrical surface perturbation which introduces an astigmatic blur into the received image which reduces aliasing of the signal in the cross-scan direction.

17 Claims, 2 Drawing Sheets

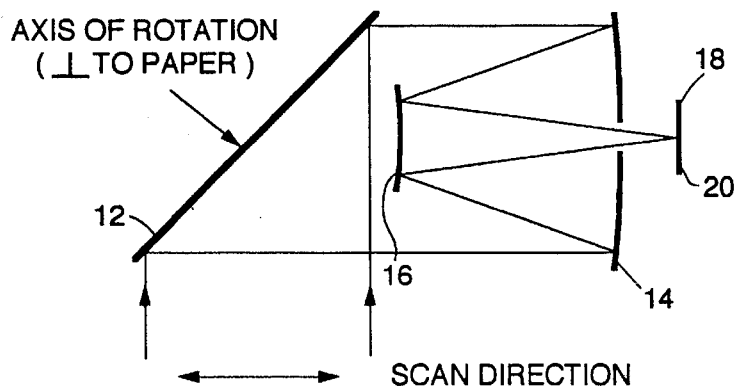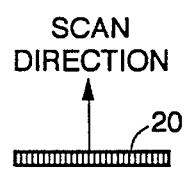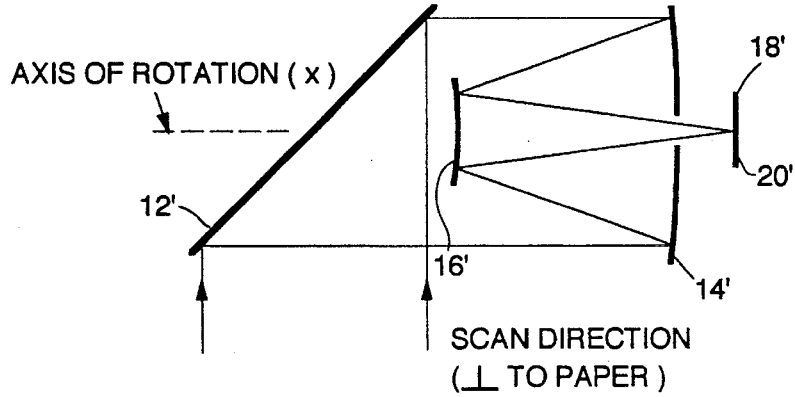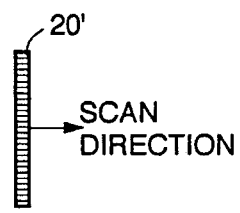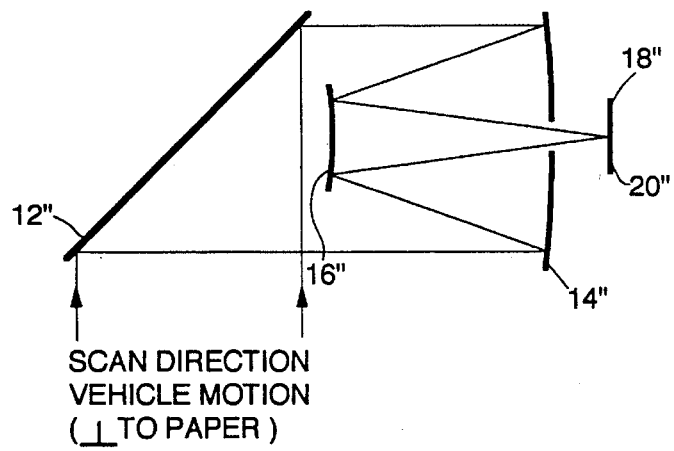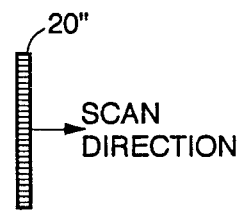

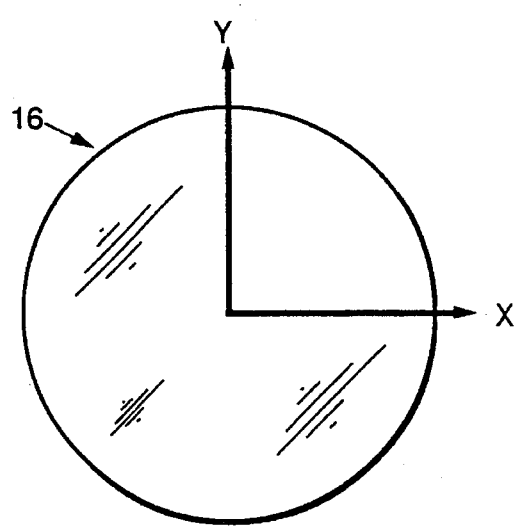
FIG. 3a.
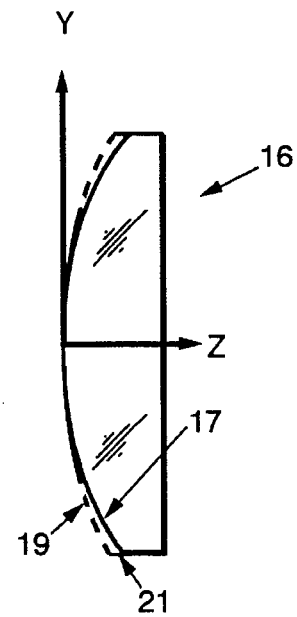
FIG. 3b.
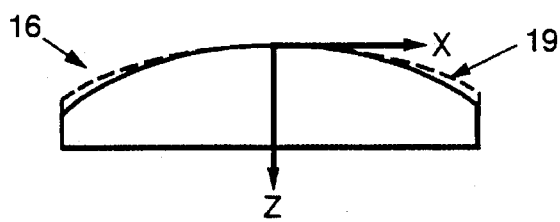
FIG. 3c.
FIG. 4.
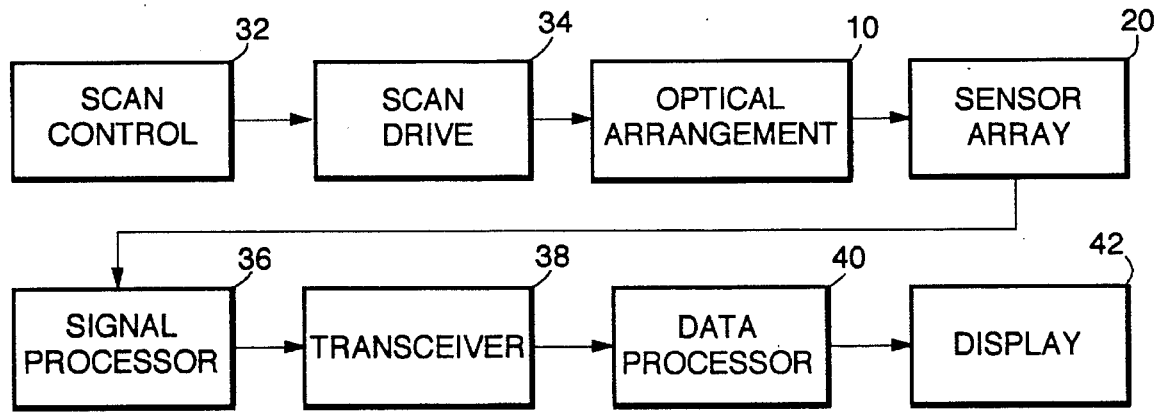

SCANNING IMAGING SYSTEM HAVING REDUCED DETECTED SIGNAL ALIASING IN CROSS SCAN DIRECTION

BACKGROUND OF THE INVENTION

1. Field of the Invention

The present invention relates to remote sensing devices. More specifically, the present invention relates to scanning radiometers.

2. Description of the Related Art

Radiometers or radiometric imagers are often disposed on spacecraft and aircraft for remote sensing for meteorological, resource mapping and other applications. The imagers generally include a sensor array which is scanned over a desired area. Scanning radiometers typically suffer from 'aliasing' in the cross-scan direction. The scan direction is the axis in which the sensor array is scanned. The cross-scan direction, often referred to as the track direction, is orthogonal to the scan direction and typically parallel to the direction of movement of the vehicle when the scan mechanism is part of the imager.

As described in *ELECTRO-OPTICAL SYSTEM DESIGN for Information Processing* by Clair L. Wyatt, published by McGraw-Hill, at page 95–96 and 205–206, aliasing is an erroneous presence of false frequencies in the output of the imager due to a presence of a modulating signal at a frequency higher that the Nyquist rate. In a sensor, scanning sensor array, aliasing introduces false frequencies into the output signal train and increases noise components.

A square detector instantaneous ground field of view (IGFOV) is generally used in a scanning radiometric imager, with the IGFOV side oriented in the scan direction. The (sin X/X) spatial frequency response in both the scan and cross-scan directions of such an arrangement is sensitive to scene spatial frequencies above the fold-over frequency, where X is equal to [$\pi$·spatial frequency (cycles/radian)·IGFOV(radians)]. (The fold-over frequency (Nyquist frequency) is the frequency above which high frequency signals in the lower sideband of the spectra about the sampled signal overlap or 'fold-over' signals in the baseline bandpass.)

The frequency response sensitivity in the scan direction is generally reduced by the use of a low-pass, sharp cut-off electrical filter with a −3 db frequency equal to the fold-over frequency. This reduces the aliasing effect in the scan direction. The detected scene high spatial frequencies in the cross-scan direction, however, are not attenuated by the electrical filter and can result in significant aliasing of the desired detected signal.

One technique for reducing aliasing in the cross-scan direction is to rotate the square IGFOV of the imager detector channels by 45 degrees so that the spatial frequency response is $[(\sin X/(2)^{1/2})/X/(2)^{1/2})]^2$ and, hence, a reduction of the frequency response to the scene's higher spatial frequencies. However, such an arrangement has a number of disadvantages. Firstly, the number of detector channels required in the cross-scan direction to cover a given swath-width to achieve contiguous scan lines at the 50% IGFOV response points is increased by as much as 41%—or the scan rate will need to be increased by 41% with the associated reduction in signal-to-noise ratio.

Secondly, the sample rate is required to be increased by 41% to maintain contiguous pixel sampling at the 50% IGFOV response points in the scan direction.

Thirdly, the signal aliasing from scene spatial frequencies between the range from the fold-over frequency to twice that frequency is actually greater than that of the unrotated detector arrangement in both the scan and cross-scan directions.

Thus, a need remains in the art for a system and technique for reducing aliasing in the cross-scan direction for a scanning radiometer.

SUMMARY OF THE INVENTION

The need in the art is addressed by the present invention which provides a system for receiving electromagnetic energy with reduced signal aliasing in the cross-scan direction. The system is adapted to be mounted on a spacecraft or an aircraft for movement over a surface in the track direction and has a sensor for receiving electromagnetic energy. The invention includes an arrangement for directing energy from the source to the sensor which has an astigmatic blur in the cross-scan direction which is effective to reduce aliasing of a signal received by the system in the cross-scan direction.

In the illustrative embodiment, the invention includes an array of radiometric sensors. A reflective optical arrangement directs energy from a surface to the sensor array. The optical arrangement includes at least one mirror which has a small controlled cylindrical surface perturbation which introduces an astigmatic blur into the received signal and thereby reduces aliasing of the signal in the cross-scan direction.

BRIEF DESCRIPTION OF THE DRAWINGS

FIG. 1A is a simplified side view of the optical arrangement of the imaging system of the present invention in which the scanning mirror rotates about an axis perpendicular to the paper.

FIG. 1B is a simplified side view of a first alternative embodiment of the optical arrangement of the imaging system of the present invention in which the scanning mirror rotates about an axis "x".

FIG. 1C is a simplified side view of a second alternative embodiment of the optical arrangement of the imaging system of the present invention in which the fold mirror is stationary and a vehicle on which the system is mounted is in motion along an axis which is perpendicular to the paper.

FIG. 2A is a magnified front view of detector array of the imaging system of the present invention oriented in accordance with the scan direction of the system of FIG. 1A.

FIG. 2B is a magnified front view of detector array of the imaging system of the present invention oriented in accordance with the scan direction of the system of FIG. 1B.

FIG. 2C is a magnified front view of detector array of the imaging system of the present invention oriented in accordance with the scan direction of the system of FIG. 1C.

FIG. 3A is a front view of the secondary mirror of the imaging system with surface perturbations in accordance with the present teachings.

FIG. 3B is a right side view of the secondary mirror depicted in FIG. 3A.

FIG. 3C is a bottom view of the secondary mirror depicted in FIG. 3A.

FIG. 4 is a block diagram of the electrical system for use with the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1A is a simplified side view of the optical arrangement of the imaging system 10 of the present invention in which a conventional scanning mirror 12 rotates about an axis perpendicular to the paper. Rotation of the scan mirror 12 is effective to scan a detector array 20 across a target surface. In a scanning radiometric optical imaging system application, energy from a scene is reflected by the scanning mirror 12 to a primary mirror 14. The primary mirror 14 reflects energy to a secondary mirror 16 which, in turn, focuses the energy onto a focal plane 18 at which a linear array of radiometric detectors 20 are disposed.

FIG. 1B is a simplified side view of a first alternative embodiment of the optical arrangement of the imaging system 10' of the present invention in which the scanning mirror 12' rotates about an axis "x".

FIG. 1C is a simplified side view of a second alternative embodiment of the optical arrangement of the imaging system 10'' of the present invention in which the fold mirror 12'' is stationary and a vehicle (not shown) on which the system is mounted is in motion along an axis which is perpendicular to the paper.

FIG. 2A is a magnified front view of detector array 20 of the imaging system of the present invention oriented in accordance with the scan direction of the system 10 of FIG. 1A. The length of the detector array in terms of the number of detector elements, will depend upon the scanning mechanism. Where the scan mechanism is part of the sensor, the number of detector elements are likely to range between 5 and 40. When the scanning motion is produced by the spacecraft motion (FIG. 1C), the number of detector elements may be greater than 500.

FIG. 2B is a magnified front view of detector array 20' of the imaging system 10' of the present invention oriented in accordance with the scan direction of the system of FIG. 1B.

FIG. 2C is a magnified front view of detector array 20'' of the imaging system 10'' of the present invention oriented in accordance with the scan direction of the system of FIG. 1C.

The primary and secondary mirrors are of conventional design with the exception that one of the mirrors has an aspherical surface perturbation as discussed more fully below. The detector arrays may be of conventional design as well.

A particularly novel aspect of the present invention is the provision of a small controlled cylindrical surface perturbation on one of the mirrors in the optical train, preferably either the primary or the secondary mirror. This creates an astigmatic wavefront which provides a blur in a direction orthogonal to the scan direction, the cross-scan direction.

FIG. 3A is a front view of the secondary mirror 16 of the imaging system 10 with surface perturbations in accordance with the present teachings.

FIG. 3B is a right side view of the secondary mirror depicted in FIG. 3A.

FIG. 3C is a bottom view of the secondary mirror depicted in FIG. 3A.

As shown in FIG. 3B, in accordance with the present teachings, the working surface 17 of the mirror 16 is an aspheric surface with cylindrical perturbation. The surface perturbation is a cylindrical surface comprised of horizontal or vertical contour lines. A traditional aspheric contour 19 with rotational symmetry is shown in dashed lines for illustration only. The difference between the two is the cylindrical perturbation 21 which may be implemented with standard optical surface figuring. Note that in FIG. 3C, no cylindrical perturbation is shown. The cylindrical surface axis of symmetry must be either parallel or perpendicular to the scan direction. The prescription methodology for the asymmetrical surface contour is provided below:

$$Z = (CUX \cdot X^2 + CUY \cdot Y^2)/(1 + SQRT(1 - (1+KX)CUX^2 \cdot X^2 - (1+KY)CUY^2Y^2)) + AR((1-AP)X^2 + (1+AP)Y^2)^2 + BR((1-BP)X^2 + (1+BP)Y^2)^3 + CR((1-CP)X^2 + (1+CP)Y^2)^4 + DR((1-DP)X^2 + (1+DP)Y^2)^5 \quad [1]$$

where:

Z is the sag of the surface parallel to the Z axis, as is well known in the art, SAG is the axial separation between a vertex and a ring of contact between the curved surface of a lens and a locating shoulder, and cux,cuy are the curvatures in X and Y, respectively.

KX,KY are the conic coefficients in X and Y, respectively, and correspond to eccentricity in the same way as K for the ASP surface type;

AR, BR, CR, and DR are the rotationally symmetric portion of the 4th, 6th, 8th, and 10th order deformation from the conic respectively; and AP, BP, CP, and DP represent the non-rotationally symmetric components of the 4th, 6th, 8th, and 10th order deformation from the conic respectively.

This is an aspheric surface with bilateral symmetry in both X and Y, but not necessarily with rotational symmetry. In addition, this is an anamorphic asphere which reduces to the ASP type when:

CUX=CUY,

KX=KY, and

AP=BP=CP=DP=0

('ASP' is an aspheric surface with rotational symmetry.) When AP=BP=CP=DP=+1 or −1, the higher order aspherizing is purely in Y or X, respectively. These equations are used in the CODE V optical design/ray tracing computer program. The Code V optical design/ray tracing program is provided by Optical Research Associates of Pasadena, Calif.

FIG. 4 is a block diagram of the electrical system 30 for use with the present invention. The electrical system 30 includes a conventional scan control system that initiates a conventional scan drive mechanism 34. The scan drive mechanism 34 effects the movement of the scan mirror 12 in the optical arrangement 10. The electrical signals output by the sensor array 20 are processed in a conventional manner by a signal processor 36 and input to a transceiver 38 for communication, in the normal course, to a ground terminal at which a data processor 40 is disposed. The electrical signals may then be shown on a display 42 or stored for later display and/or processing.

The invention provides a controlled astigmatic optical arrangement such that when the image scene is at best focus in the scan direction a small de-focus condition exists in the cross-scan direction. The resultant blur in the cross-scan direction simulates the effect of an electrical filter in the cross-scan direction, similar to the actual electrical filter used in the scan direction, and, hence, reduces the magnitude of the detected higher scene spatial frequencies and the degree of aliasing. In the illustrative embodiment, the blur dimension is one half of the detector size in the cross-scan direction.

Thus, the present invention has been described herein with reference to a particular embodiment for a particular application. Those having ordinary skill in the art and access to the present teachings will recognize additional modifications applications and embodiments within the scope thereof. For example, the invention is not limited to sensing systems with onboard scan mechanisms. The invention may be used where the scan motion is provided by the vehicle (i.e., a spacecraft, aircraft, or other vehicle.)

It is therefore intended by the appended claims to cover any and all such applications, modifications and embodiments within the scope of the present invention.

Accordingly,

What is claimed is:

1. A system for receiving electromagnetic energy, said system being mounted for movement over a surface and comprising:

first means for receiving electromagnetic radiation and second means for directing electromagnetic radiation to said first means, said second means having an astigmatic blur in a first direction effective to reduce aliasing of a signal received by said first means in said first direction.

2. The invention of claim 1 wherein said first direction is orthogonal to a direction of scan of said system.

3. The invention of claim 1 wherein said second means is a reflective arrangement.

4. The invention of claim 3 wherein said reflective arrangement includes a scan mirror for directing energy between said surface and said first means.

5. The invention of claim 4 wherein said reflective arrangement includes a primary mirror in optical alignment with said scan mirror.

6. The invention of claim 5 wherein said reflective arrangement includes a secondary mirror in optical alignment with said primary mirror for directing energy between said first means and said primary mirror.

7. The invention of claim 6 wherein at least one of said mirrors has a surface contour which blurs electromagnetic radiation reflected by said mirror in the first direction to reduce aliasing of detected signal.

8. The invention of claim 7 wherein said first means includes an array of detectors.

9. The invention of claim 8 further including third means for moving said scan mirror over said surface along a second scan direction.

10. The invention of claim 9 further including fourth means for processing the energy received by said first means.

11. A radiometric imaging system for receiving electromagnetic energy, said imaging system being mounted for movement over a surface in a first direction and comprising:

first sensor means for detecting electromagnetic radiation from said surface and providing electrical output signals in response thereto;

second means for directing electromagnetic radiation from said surface to said first means, said second means having an astigmatic blur in the first direction effective to reduce aliasing of a signal received by said first means in said first direction;

third means for moving said second means over said surface along a second scan direction; and fourth means for processing said electrical signals output by said first means.

12. The invention of claim 11 wherein said second means is a reflective arrangement.

13. The invention of claim 12 wherein said reflective arrangement includes a scan mirror for directing energy between said surface and said first means.

14. The invention of claim 13 wherein said reflective arrangement includes a primary mirror in optical alignment with said scan mirror.

15. The invention of claim 14 wherein said reflective arrangement includes a secondary mirror in optical alignment with said primary mirror for directing energy between said first means and said primary mirror.

16. The invention of claim 15 wherein at least one of said mirrors has a surface contour which blurs electromagnetic radiation reflected by said mirror in the first direction to reduce aliasing of detected signal.

17. A method for reducing aliasing in a signal received by an electromagnetic sensor along a first axis including the steps of:

directing electromagnetic energy between a sensor and a target area and creating an astigmatic blur in said energy along said first axis.

* * * * *